United States Patent [19]

Eilingsfeld et al.

[11] Patent Number: 5,145,952
[45] Date of Patent: Sep. 8, 1992

[54] THIOPHENEAZO DYES WITH A COUPLING COMPONENT BASED ON M-PHENYLENEDIAMINE

[75] Inventors: Heinz Eilingsfeld; Karl-Heinz Etzbach, both of Frankenthal; Guenter Hansen, Ludwigshafen; Helmut Reichelt, Neustadt; Ernst Schefczik, Ludwigshafen, all of Fed. Rep. of Germany

[73] Assignee: BASF Aktiengesellschaft, Ludwigshafen, Fed. Rep. of Germany

[21] Appl. No.: 459,255

[22] Filed: Dec. 29, 1989

[30] Foreign Application Priority Data

Jan. 25, 1989 [DE] Fed. Rep. of Germany ....... 3902005

[51] Int. Cl.$^5$ .................... C09B 29/033; C09B 29/09; D06P 1/18; D06P 3/36
[52] U.S. Cl. .................... 534/753; 534/738; 534/794
[58] Field of Search ................. 534/751, 753, 794, 595

[56] References Cited

U.S. PATENT DOCUMENTS 4,307,015 12/1981 Koerte ............................ 534/753 X
4,321,055 3/1982 Hansen et al. .................. 534/850 X
4,874,392 10/1989 Henzi ............................. 534/753 X

FOREIGN PATENT DOCUMENTS 201896 11/1986 European Pat. Off. ............ 534/753
59-204658 11/1984 Japan ................................ 534/753
1268040 3/1972 United Kingdom .
1434654 5/1976 United Kingdom .
1465391 2/1977 United Kingdom ................. 534/753
2163768 3/1986 United Kingdom ................. 534/753

OTHER PUBLICATIONS

Research Disclosure, Oct. 1980, No. 19826, pp. 425–427.
Schefczik et al., Chemical Abstracts, vol. 106, No. 139827a (1987).

Primary Examiner—Mary C. Lee
Assistant Examiner—Fiona T. Powers

Attorney, Agent, or Firm—Oblon, Spivak, McClelland, Maier & Neustadt

[57] ABSTRACT

Thiopheneazo dyes of the formula

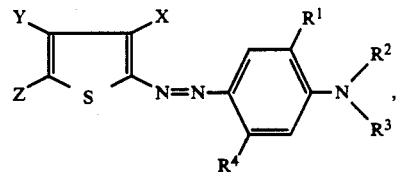

where
X is cyano or $C_1$–$C_4$-alkoxycarbonyl,
Y is halogen, hydroxyl, mercapto, substituted or unsubstituted $C_1$–$C_6$-alkoxy, $C_5$–$C_7$-cycloalkoxy, substituted or unsubstituted phenoxy, substituted or unsubstituted $C_1$–$C_6$-alkylthio, $C_5$–$C_7$-cycloalkylthio, substituted or unsubstituted phenylthio, $C_1$–$C_6$-alkylsulfonyl or substituted or unsubstituted phenylsulfonyl,
Z is nitro, cyano, $C_1$–$C_4$-alkanoyl, benzoyl, $C_1$–$C_4$-alkylsulfonyl, phenylsulfonyl or a radical of the formula —CH=CB$^1$B$^2$ or —CH=N—B$^3$, in which B$^1$ and B$^2$ independently of the other are cyano, substituted or unsubstituted $C_1$–$C_6$-alkoxycarbonyl or $C_3$–$C_6$-alkenyloxycarbonyl or one of B$^1$ and B$^2$ is cyano and the other is $C_1$–$C_4$-alkylsulfonyl, substituted or unsubstituted phenyl, benzoyl, phenylsulfonyl or carbamoyl and B$^3$ is hydroxyl, $C_1$–$C_4$-alkoxy, phenoxy or phenylamino,
R$^1$ is $C_1$–$C_4$-alkoxy,
R$^2$ is hydrogen, substituted or unsubstituted $C_1$–$C_{10}$-alkyl or R$^3$,
R$^3$ is a radical of the formula CH$_2$—CH(OR$^5$)—CH$_2$R$^6$ and
R$^4$ is substituted or unsubstituted $C_1$–$C_6$-alkanoylamino or substituted or unsubstituted benzoylamino,
R$^5$ being hydrogen, $C_1$–$C_{10}$-alkanoyl, $C_1$–$C_{10}$-alkoxycarbonyl or $C_1$–$C_{10}$-mono- or -dialkyl-carbamoyl, the alkyl groups of said substituents being uninterrupted or interrupted by oxygen atoms, and
R$^6$ being chlorine, bromine hydroxyl or substituted or unsubstituted are useful for dyeing textile fibers.

2 Claims, No Drawings

THIOPHENEAZO DYES WITH A COUPLING COMPONENT BASED ON M-PHENYLENEDIAMINE

The present invention relates to novel thiopheneazo dyes of the formula I

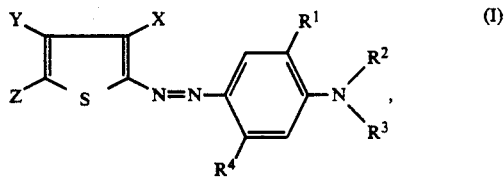

where

X is cyano or $C_1$-$C_4$-alkoxycarbonyl,

Y is halogen, hydroxyl, mercapto, unsubstituted or phenyl-substituted $C_1$-$C_6$-alkoxy, $C_5$-$C_7$-cycloalkoxy, substituted or unsubstituted phenoxy unsubstituted or phenyl-substituted $C_1$-$C_6$-alkylthio, $C_5$-$C_7$-cycloalkylthio, substituted or unsubstituted phenylthio, $C_1$-$C_6$-alkylsulfonyl or substituted or unsubstituted phenylsulfonyl, Z is nitro, cyano, $C_1$-$C_4$-alkanoyl benzoyl $C_1$-$C_4$-alkylsulfonyl, phenylsulfonyl or a radical of the formula —CH=CB$^1$B$^2$ or —CH=N—B$^3$, in which B$^1$ and B$^2$ are identical or different and each independently of the other are cyano, $C_1$-$C_6$-alkoxycarbonyl whose alkyl chain may be interrupted by one or more oxygen atoms, or $C_3$-$C_6$-alkenyloxycarbonyl or one of B$^1$ and B$^2$ is cyano and the other is $C_1$-$C_4$-alkylsulfonyl substituted or unsubstituted phenyl, benzoyl, phenylsulfonyl or carbamoyl and B$^3$ is hydroxyl-, $C_1$-$C_4$-alkoxy, phenoxy or phenylamino, R$^1$ is $C_1$-$C_4$-alkoxy, R$^2$ is hydrogen, $C_1$-$C_{10}$-alkyl which may be interrupted by one or more oxygen atoms, or R$^3$, R$^3$ is a radical of the formula CH$_2$—CH(OR$^5$)—CH$_2$R$^6$ and R$^4$ is unsubstituted or hydroxyl-, $C_1$-$C_4$-alkoxy-, phenoxy-, chlorine- or $C_1$-$C_4$-alkanoyloxy-substituted $C_1$-$C_6$-alkanoylamino or substituted or unsubstituted benzoylamino, R$^5$ being hydrogen, $C_1$-$C_{10}$-alkanoyl, $C_1$-$C_{10}$-alkoxycarbonyl or $C_1$-$C_{10}$-mono- or -dialkyl-carbamoyl, the alkyl groups of said substituents being uninterrupted or interrupted by one or more oxygen atoms, and R$^6$ being chlorine, bromine, hydroxyl, phenoxy, allyloxy, $C_1$-$C_{10}$-alkoxy which may be interrupted by one or more oxygen atoms or substituted by hydroxyl phenoxy, phenyl, $C_1$-$C_8$-alkanoyloxy, chlorine, bromine or cyano, $C_1$-$C_6$-alkanoyloxy, $C_1$-$C_6$-mono- or -dialkylaminocarbonyloxy or phenylaminocarbonyloxy.

EP-A-201,896, DE-A-3,529,831 and DE-A-3,535,133 already disclose thiopheneazo dyes of a similar structure.

It is an object of the present invention to make available new thiopheneazo dyes which have a coupling component based on m-phenylenediamine and which have advantageous application properties.

We have found that this object is achieved by the thiopheneazo dyes of the formula I specified at the beginning.

All the alkyl and alkenyl groups appearing in the abovementioned radicals can be not only straight-chain but also branched.

If substituted phenyl appears in the abovementioned formula I, suitable substituents are for example $C_1$-$C_4$-alkyl, $C_1$-$C_4$-alkoxy or halogen, in particular chlorine or bromine.

Oxygen-interrupted alkyl in the abovementioned formula I is preferably interrupted by one or two oxygen atoms.

Z in the formula I is for example formyl, acetyl, propionyl, butyryl or isobutyryl.

X, B$^1$ and B$^2$ are for example methoxycarbonyl, ethoxycarbonyl, propoxycarbonyl, isopropoxycarbonyl, butoxycarbonyl or isobutoxycarbonyl.

B$^1$ and B$^2$ are each further for example pentyloxycarbonyl, isopentyloxycarbonyl, neopentyloxycarbonyl, hexyloxycarbonyl, 2-methoxyethoxycarbonyl, 2-ethoxyethoxycarbonyl, 2-butoxyethoxycarbonyl, allyloxycarbonyl, methallyloxycarbonyl, ethylallyloxycarbonyl, phenyl, 4-methylphenyl, 2-ethoxyphenyl, 4-chlorophenyl or 2,4-dichlorophenyl.

B$^1$ and B$^2$, like Y and Z, are each further for example methylsulfonyl, ethylsulfonyl, propylsulfonyl, isopropylsulfonyl or butylsulfonyl.

Y is further for example fluorine, chlorine, bromine, methoxy, ethoxy, propoxy, isopropoxy, butoxy, isobutoxy, sec-butoxy, pentyloxy, isopentyloxy, neopentyloxy, tert-pentyloxy, hexyloxy, benzyloxy, 2-phenylethoxy, cyclopentyloxy, cyclohexyloxy, cycloheptyloxy, phenoxy, 4-methylphenoxy, 4-isopropylphenoxy, 4-methoxyphenoxy, 4-bromophenoxy, methylthio, ethylthio, isopropylthio, benzylthio, 2-phenylethylthio, cyclohexylthio, phenylthio, 4-chlorophenylthio, pentylsulfonyl, isopentylsulfonyl, hexylsulfonyl or 4-methylphenylsulfonyl.

R$^1$ and B$^3$ are each for example methoxy, ethoxy, propoxy, isopropoxy, butoxy, isobutoxy or sec-butoxy.

R$^2$ is for example methyl, ethyl, propyl, isopropyl, butyl, isobutyl, sec-butyl, tert-butyl, pentyl, isopentyl, neopentyl, tert-pentyl, hexyl, heptyl, octyl, 2-ethylhexyl, nonyl, decyl, 2-methoxy-ethyl, 2-ethoxyethyl, 2-propoxyethyl, 2-butoxyethyl, 2-methoxypropyl, 3-methoxypropyl, 3-ethoxypropyl, 2-methoxybutyl, 4-methoxybutyl, 2-ethoxybutyl, 4-ethoxybutyl, 3,6-dioxaheptyl or 3,6-dioxaoctyl.

R$^4$ is for example NHCOCH$_3$, NHCOC$_2$H$_5$, NHCOC$_3$H$_7$, NHCOCH$_2$OCH$_3$, NHCOCH$_2$OC$_2$H$_5$, NHCOCH$_2$OC$_6$H$_5$, NHCOCH$_2$OH, NHCOCH$_2$OCOCH$_3$, NHCOCH$_2$Cl, NHCOC$_2$H$_4$OCH$_3$, NHCOC$_6$H$_5$, NHCOC$_6$H$_4$-4-OCH$_3$, NHCOC$_6$H$_4$-4-CH$_3$ or NHCOC$_6$H$_4$-4-Cl.

R$^5$ is for example formyl, acetyl, propionyl, butyryl, isobutyryl, pentanoyl, isopentanoyl, hexanoyl, heptanoyl, octanoyl, 2-ethylhexanoyl, nonanoyl, decanoyl, 4-oxapentanol, 4-oxahexanoyl, 4,7-dioxaoctanoyl, methoxycarbonyl, ethoxycarbonyl, propoxycarbonyl, butoxycarbonyl, isopropoxycarbonyl, isobutoxycarbonyl, pentyloxycarbonyl, hexyloxycarbonyl, mono- or dimethylcarbamoyl, mono- or diethylcarbamoyl, mono- or dipropylcarbamoyl, mono- or diisopropylcarbamoyl or mono- or dibutylcarbamoyl.

R$^6$ is not only as defined above but also for example methoxy, ethoxy, propoxy, isopropoxy, butoxy, isobutoxy, pentyloxy, hexyloxy, heptyloxy, octyloxy, 2-ethylhexyloxy, nonyloxy, decyloxy, 2-methoxyethoxy, 2-ethoxyethoxy, 2-propoxyethoxy, 2-butoxyethoxy, 2-methoxypropoxy, 3-methoxypropoxy, 3-ethoxypropoxy, 2-methoxybutoxy, 4-methoxybutoxy, 2-ethoxybutoxy, 4-ethoxybutoxy, 3,6-dioxaheptyloxy, 3,6-dioxaoctyloxy, 2-phenylethoxy, 8-phenyl-4,7-dioxaoctyloxy, 2-cyanoethoxy, 2-cyanopropoxy, 3-cyanopropoxy, 4-cyanobutoxy, 5-cyano-3-oxapentyloxy, 6-cyano-4-oxahexyloxy, 8-cyano-4-oxahexyloxy, 2-hydroxyethoxy, 2- or 3-hydroxypropoxy, 2,3-dihydroxypropoxy, 2-hydroxybutoxy, 4-hydroxybutoxy,5-hydroxy-3-oxapentyloxy, 6-hydroxy-4-oxahexyloxy, 8-hydroxy-4-oxaoctyloxy, 8-hydroxy-3,6-dioxaoctyloxy, 2-phenyl-2-hydroxethoxy, 2-chloroethoxy, 2-bromoethoxy, 2-phenoxyethoxy, 3-phenoxypropoxy, 4-phenoxybutoxy, 5-phenoxy-3-oxapentyloxy, 6-phenoxy-4-oxahexyloxy, 8-phenoxy-4-oxaoctyloxy,2-formyloxyethoxy, 2-acetyloxyethoxy, 2-propionyloxyethoxy, 2-butyryloxyethoxy, 2-(2-ethylhexanoyloxy)ethoxy, 2- or 3-acetyloxypropoxy, 2- or 3-propionyloxypropoxy, 2- or 3-(2-ethylhexanoyloxy)propoxy, 4-acetyloxybutoxy, 4-propionyloxybutoxy, 4-(2-ethylhexanoyloxy)butoxy, 5-acetyloxy-3-oxapentyloxy, 5-propionyloxy-3-oxapentyloxy, 5-(2-ethylhexanoyloxy)-3-oxapentyloxy, 6-acetyloxy-4-oxahexyloxy, 6-propionyloxy-4-oxahexyloxy, 6-(2-ethylhexanoyloxy)-4-oxahexyloxy, 8-acetyloxy-4-oxaoctyloxy, 8-propionyloxy-4-oxaoctyloxy, 8-(2-ethylhexanoyloxy)-4-oxaoctyloxy, formyloxy, acetyloxy, propionyloxy, butyryloxy, isobutyryloxy, pentanoyloxy, hexanoyloxy, mono- or dimethylcarbamoyloxy, mono- or diethylcarbamoyloxy, mono- or dipropylcarbamoyloxy, mono- or diisopropylcarbamoyloxy, mono- or dibutylcarbamoyloxy or N-methyl-N-ethylcarbamoyloxy.

Preference is given to thiopheneazo dyes of the formula I where
X is cyano or $C_1$-$C_4$-alkoxycarbonyl,
Y is halogen, $C_1$-$C_4$-alkoxy, phenylthio or phenylsulfonyl,
Z is cyano, formyl or a radical of the formula —CH=C$B^1B^2$, in which $B^1$ is cyano and $B^2$ is cyano or $C_1$-$C_4$-alkoxycarbonyl,
$R^1$ is $C_1$-$C_4$-alkoxy,
$R^2$ is hydrogen or $C_1$-$C_4$-alkyl,
$R^3$ is a radical of the formula —CH$_2$—CH(OR$^5$)—CH$_2$R$^6$ and
$R^4$ is $C_1$-$C_4$-alkanoylamino,
$R^5$ being hydrogen or $C_1$-$C_4$-alkanoyl and
$R^6$ being chlorine bromine hydroxy, phenoxy, allyloxy, $C_1$-$C_4$-alkoxy or $C_1$-$C_4$-alkanoyloxy.

Particular preference is given to thiopheneazo dyes of the formula I where
X is cyano,
Y is chlorine, bromine, methoxy, ethoxy, phenylthio or phenylsulfonyl,
Z is cyano or formyl,
$R^1$ is methoxy or ethoxy,
$R^2$ is hydrogen or $C_1$-$C_4$-alkyl,
$R^3$ is a radical of the formula —CH$_2$—CH(OR$^5$)—CH$_2$R$^6$ and
$R^4$ is $C_1$-$C_4$-alkanoylamino,
$R^5$ being hydrogen or $C_1$-$C_4$-alkanoyl and
$R^6$ being chlorine, bromine, hydroxy, phenoxy, allyloxy, $C_1$-$C_4$-alkoxy or $C_1$-$C_4$-alkanoyloxy.

Suitable dyes are in particular those of the formula I where
X is cyano,
Y is chlorine or ethoxy,
Z is cyano or formyl,
$R^2$ is hydrogen,
$R^4$ is acetylamino and
$R^5$ is hydrogen.

The thiopheneazo dyes of the formula I according to the present invention can be prepared in a conventional manner. For instance, an aminothiophene of the formula II

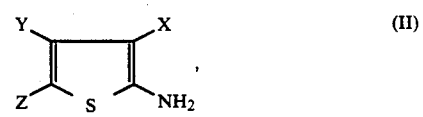

where X, Y and Z are each as defined above, can be diazotized and coupled to an m-phenylenediamine derivative of the formula III

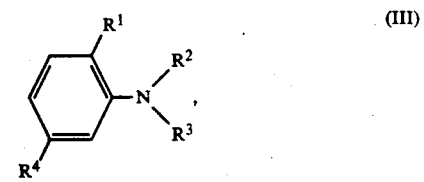

where $R^1$, $R^2$, $R^3$ and $R^4$ are each as defined above.

The aminothiophenes II and m-phenylene derivatives III are in general known compounds (for example see EP-A-193,885 and also DE-A-3,004,654).

The novel thiopheneazo dyes are advantageously used as disperse dyes for dyeing textile fibers, in particular polyesters or cellulose esters, but also polyamides or blend fabrics of polyesters and cellulose fibers. They have not only a high color strength but also very good fastness properties.

The Examples which follow will illustrate the invention in more detail.

EXAMPLE 1

9.4 g of 2-amino-4-chloro-5-formyl-3-cyanothiophene were suspended at not more than 30° C. in 60 ml of 85% strength by weight sulfuric acid. 16.6 g of nitrosylsulfuric acid (11.5% of $N_2O_3$) were added dropwise at 0°-5° C. over 0.5 hours, and the mixture was stirred at that temperature for a further 2 hours.

The diazonium salt solution thus obtained was slowly run at 0°-5° C. into a mixture of 16 g of N-(2-hydroxy-4-oxaoctyl)-2-methoxy-5-acetylaminoaniline in 25 ml of N,N-dimethylformamide, 100 ml of water, 20 ml of dilute hydrochloric acid, 0.5 g of sulfamic acid and 300 g of ice. After the coupling had ended, the dye was filtered off with suction, washed neutral and dried. This gave 20.9 g of the dye of the formula

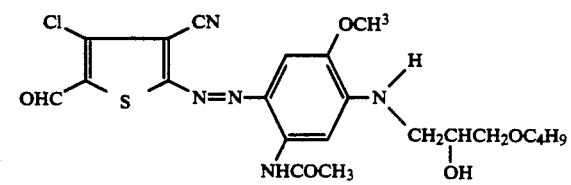

which dyes polyester fibers in fast, greenish blue shades.

The same method was used to obtain the dyes of the formula

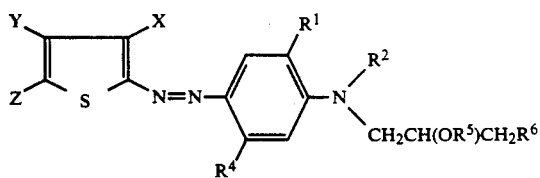

listed in Table 1.

neutral and dried. This gave 16.6 g of the dye of the formula

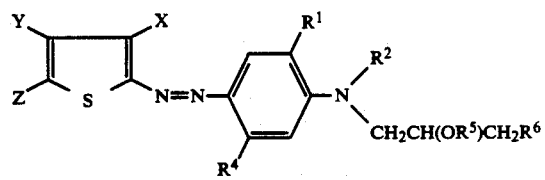

TABLE 1

| Ex. No. | X | Y | Z | $R^1$ | $R^2$ | $R^4$ | $R^5$ | $R^6$ | Hue on PES |
|---|---|---|---|---|---|---|---|---|---|
| 2 | CN | Cl | CHO | $OCH_3$ | H | $NHCOC_2H_5$ | H | $OC_2H_5$ | greenish blue |
| 3 | CN | Cl | CHO | $OC_2H_5$ | H | $NHCOCH_3$ | H | $OC_4H_9$ | greenish blue |
| 4 | CN | Cl | CHO | $OCH_3$ | H | $NHCOCH_3$ | H | $OCH_3$ | greenish blue |
| 5 | CN | Cl | CHO | $OCH_3$ | H | $NHCOCH_3$ | H | $OC_6H_5$ | greenish blue |
| 6 | CN | Cl | CHO | $OCH_3$ | H | $NHCOCH_3$ | H | OH | greenish blue |
| 7 | CN | Cl | CHO | $OCH_3$ | H | $NHCOCH_3$ | H | $OC_2H_4OC_2H_5$ | greenish blue |
| 8 | CN | Cl | CHO | $OCH_3$ | H | $NHCOCH_3$ | H | $OCH_3$ | greenish blue |
| 9 | CN | Br | CHO | $OCH_3$ | H | $NHCOCH_3$ | H | $OC_4H_9$ | greenish blue |
| 10 | CN | Cl | CHO | $OC_2H_5$ | H | $NHCOC_2H_5$ | H | $OC_4H_9$ | greenish blue |
| 11 | CN | Cl | CHO | $OCH_3$ | H | $NHCOC_2H_5$ | H | $OC_2H_4OC_2H_5$ | greenish blue |
| 12 | CN | Cl | CHO | $OCH_3$ | H | $NHCOCH_2OCH_3$ | H | OH | greenish blue |
| 13 | CN | Cl | CHO | $OCH_3$ | H | $NHCOC_6H_5$ | H | $OC_4H_9$ | greenish blue |
| 14 | CN | Cl | CHO | $OCH_3$ | $C_2H_5$ | $NHCOCH_3$ | H | $OC_4H_9$ | greenish blue |
| 15 | CN | Cl | CHO | $OCH_3$ | $C_4H_9$ | $NHCOCH_3$ | H | $OC_2H_5$ | greenish blue |
| 16 | CN | Cl | 1) | $OCH_3$ | H | $NHCOCH_3$ | H | $OC_4H_9$ | green |
| 17 | CN | Cl | 2) | $OCH_3$ | H | $NHCOCH_3$ | H | $OC_4H_9$ | green |
| 18 | 3) | Cl | CHO | $OCH_3$ | H | $NHCOCH_3$ | H | $OC_4H_9$ | blue |
| 19 | CN | Cl | CHO | $OCH_3$ | H | $NHCOCH_3$ | H | Cl | greenish blue |

1) $CH = C(CN)_2$
2) $CH = C(CN)CO_2C_4H_9$
3) $CO_2C_2H_5$

EXAMPLE 20

9.18 g of 2-amino-4-chloro-3,5-dicyanothiophene were introduced into a mixture of 120 ml of 3:1 v/v of glacial acetic acid/propionic acid and 20 ml of 85% strength by weight of sulfuric acid. 17.3 g of nitrosylsulfuric acid (11.5% of $N_2O_3$) were added dropwise at 0°–5° C., and the mixture was stirred at that temperature for 3 hours.

The diazonium salt solution was added dropwise at 0°–5° C. to a mixture of 16 g of N-(2-hydroxy-4-oxaoctyl)-2-methoxy-5-acetylaminoaniline in 50 ml of N,N-dimethylformamide, 100 ml of water, 20 ml of dilute hydrochloric acid, 0.5 g of sulfamic acid and 300 g of ice. After 2 hours at 0°–5° C., the mixture was worked up, and the dye was filtered off with suction, washed neutral and dried. This gave 16.6 g of the dye of the formula which dyes polyester in greenish blue shades which are fast to light and dry heat setting and pleating.

The same method was used to obtain the dyes of the formula listed in the following Table 2:

TABLE 2

| Ex. No. | X | Y | Z | $R^1$ | $R^2$ | $R^4$ | $R^5$ | $R^6$ | Hue on PES |
|---|---|---|---|---|---|---|---|---|---|
| 21 | CN | Cl | CN | $OCH_3$ | H | $NHCOC_2H_5$ | H | $OC_2H_5$ | greenish blue |
| 22 | CN | Cl | CN | $OC_2H_5$ | H | $NHCOCH_3$ | H | $OC_4H_9$ | greenish blue |
| 23 | CN | Cl | CN | $OCH_3$ | H | $NHCOCH_3$ | H | $OCH_3$ | greenish blue |

TABLE 2-continued

| Ex. No. | X | Y | Z | R¹ | R² | R⁴ | R⁵ | R⁶ | Hue on PES |
|---|---|---|---|---|---|---|---|---|---|
| 24 | CN | Cl | CN | OCH₃ | H | NHCOCH₃ | H | OC₆H₅ | greenish blue |
| 25 | CN | Cl | CN | OCH₃ | H | NHCOCH₃ | H | OH | greenish blue |
| 26 | CN | Cl | CN | OCH₃ | H | NHCOCH₃ | H | OC₂H₄OC₂H₅ | greenish blue |
| 27 | CN | Cl | CN | OCH₃ | H | NHCOCH₃ | H | OCH₃ | greenish blue |
| 28 | CN | Br | CN | OCH₃ | H | NHCOCH₃ | H | OC₄H₉ | greenish blue |
| 29 | CN | Cl | CN | OC₂H₅ | H | NHCOC₂H₅ | H | OC₄H₉ | greenish blue |
| 30 | CN | Cl | CN | OCH₃ | H | NHCOC₂H₅ | H | OC₂H₄OC₂H₅ | greenish blue |
| 31 | CN | Cl | CN | OCH₃ | H | NHCOCH₂OCH₃ | H | OH | greenish blue |
| 32 | CN | Cl | CN | OCH₃ | H | NHCOC₆H₅ | H | OC₄H₉ | greenish blue |
| 33 | CN | Cl | CN | OCH₃ | C₂H₅ | NHCOCH₃ | H | OC₄H₉ | greenish blue |
| 34 | CN | Cl | CN | OCH₃ | C₄H₉ | NHCOCH₃ | H | OC₂H₅ | greenish blue |
| 35 | CN | Cl | NO₂ | OCH₃ | H | NHCOCH₃ | H | OC₄H₉ | green |
| 36 | CN | Cl | NO₂ | OCH₃ | H | NHCOCH₃ | H | OC₄H₉ | green |
| 37 | 1) | Cl | CN | OCH₃ | H | NHCOCH₃ | H | OC₄H₉ | blue |
| 38 | CN | Cl | CN | OCH₃ | H | NHCOCH₃ | H | Cl | greenish blue |

1) CO₂C₂H₅

EXAMPLE 39

2.54 g of the dye described in Example 1 were admixed in 20 ml of N,N-dimethylformamide with 1.02 g of acetic anhydride and 0.30 g of dry sodium acetate, and the mixture was heated at 65° C. for 2 hours.

After cooling down to 25° C., the mixture was poured onto 200 ml of ice-water and worked up.

This gave 2.2 g of the dye of the formula

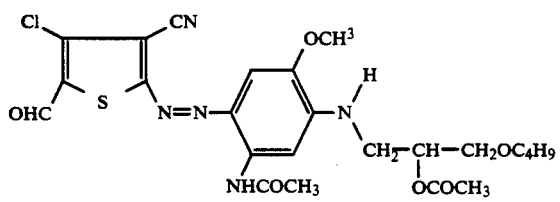

which dyes polyester in greenish shades having good all round fastness properties.

The same method was used to obtain the dyes of the formula

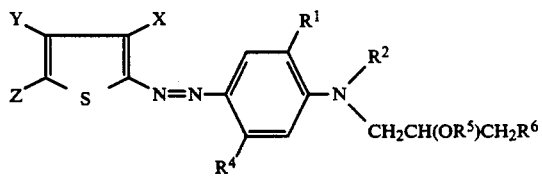

listed in the following Table 3:

TABLE 3

| Ex. No. | X | Y | Z | R¹ | R² | R⁴ | R⁵ | R⁶ | Hue on PES |
|---|---|---|---|---|---|---|---|---|---|
| 40 | CN | Cl | CHO | OCH₃ | H | NHCOCH₃ | COC₂H₅ | OC₄H₉ | greenish blue |
| 41 | CN | Cl | CHO | OCH₃ | H | NHCOCH₃ | COC₄H₉ | OC₄H₉ | greenish blue |
| 42 | CN | Cl | CHO | OCH₃ | H | NHCOCH₃ | COC₆H₁₃ | OCH₃ | greenish blue |
| 43 | CN | Cl | CHO | OCH₃ | H | NHCOCH₃ | CO₂C₂H₅ | OC₂H₅ | greenish blue |
| 44 | CN | Cl | CHO | OCH₃ | H | NHCOC₂H₅ | 1) | OC₆H₅ | greenish blue |
| 45 | CN | Cl | CHO | OCH₃ | H | NHCOCH₃ | 2) | OC₄H₉ | greenish blue |
| 46 | CN | Cl | CHO | OC₂H₅ | H | NHCOCH₃ | COC₃H₇ | OCH₃ | greenish blue |
| 47 | CN | Br | CHO | OCH₃ | H | NHCOCH₃ | COCH₃ | OC₂H₅ | greenish blue |
| 48 | 3) | Cl | CHO | OCH₃ | H | NHCOCH₃ | COCH₃ | OC₄H₉ | blue |
| 49 | CN | Cl | CN | OCH₃ | H | NHCOCH₃ | COC₂H₅ | OCH₃ | greenish |

TABLE 3-continued

| Ex. No. | X | Y | Z | $R^1$ | $R^2$ | $R^4$ | $R^5$ | $R^6$ | Hue on PES |
|---|---|---|---|---|---|---|---|---|---|
| 50 | CN | Cl | CN | $OCH_3$ | $C_2H_5$ | $NHCOCH_3$ | $COC_5H_{11}$ | $OCH_3$ | blue greenish |

1) $COC_2H_4OCH_3$
2) $CON(C_2H_5)_2$
3) $CO_2Et$

We claim:

1. A thiopheneazo dye of formula I

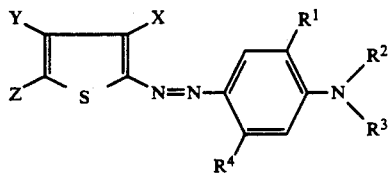

(I)

wherein

X is cyano,

Y is halogen, hydroxyl, mercapto, unsubstituted or phenyl-substituted $C_1$-$C_6$-alkoxy, $C_5$-$C_7$-cycloalkoxy, substituted or unsubstituted phenoxy, unsubstituted or phenyl-substituted $C_1$-$C_6$-alkylthio, $C_5$-$C_7$-cycloalkylthio, phenylthio, chlorophenylthio, $C_1$-$C_6$-alkylsulfonyl, phenylsulfonyl or methylphenylsulfonyl, is nitro, cyano, $C_1$-$C_4$-alkanoyl, benzoyl, $C_1$-$C_4$-alkylsulfonyl, phenylsulfonyl or a radical of the formula —CH=$CB^1B^2$ or —CH=N—$B^3$, in which $B^1$ and $B^2$ are identical or different and each independently of the other is cyano, $C_1$-$C_6$-alkoxycarbonyl whose alkyl chain may be interrupted by one or two oxygen atoms, or $C_3$-$C_6$-alkenyloxycarbonyl or one of $B^1$ and $B^2$ is cyano and the other is $C_1$-$C_4$-alkylsulfonyl, substituted or unsubstituted phenyl, benzoyl, phenylsulfonyl or carbamoyl and $B^3$ is hydroxyl, $C_1$-$C_4$-alkoxy, phenoxy or phenylamino $R^1$ is $C_1$-$C_4$-alkoxy, $R^2$ is hydrogen, $C_1$-$C_{10}$-alkyl which may be interrupted by one or two oxygen atoms, or $R^3$, $R^3$ is radical of the formula $CH_2$—$CH(OR^5)$—$CH_2R^6$ and $R^4$ is unsubstituted or hydroxyl-, $C_1$-$C_4$-alkoxy-, phenoxy-, chlorine- or $C_1$-$C_4$-alkanoyloxy-substituted $C_1$-$C_6$-alkanoylamino, benzoylamino, or benzoylamino substituted by methoxy, methyl or chloro, $R^5$ is hydrogen, $C_1$-$C_{10}$-alkanoyl, $C_1$-$C_{10}$-alkoxycarbonyl or $C_1$-$C_{10}$-mono- or dialkyl-carbamoyl, the alkyl groups of said substituents being uninterrupted or interrupted by one or two oxygen atoms, and $R^6$ is chlorine, bromine, hydroxyl, phenoxy, allyloxy, $C_1$-$C_{10}$-alkoxy which may be interrupted by one or two oxygen atoms or substituted by hydroxyl, phenoxy, phenyl, $C_1$-$C_8$-alkanoyloxy, chlorine, bromine or cyano, $C_1$-$C_6$-alkanoyloxy, $C_1$-$C_6$-mono- or -dialkyl- aminocarbonyloxy or phenylaminocarbonyloxy and the substituents on substituted phenyl are independently selected from the group consisting of $C_1$-$C_4$-alkyl, $C_1$-$C_4$-alkoxy and halogen, and the substituents on substituted phenoxy are methyl, isopropyl, methoxy or bromo.

2. A thiopheneazo dye as claimed in claim 1, wherein

X is cyano,

Y is halogen, $C_1$-$C_4$-alkoxy, phenylthio or phenylsulfonyl,

Z is cyano, formyl or a radical of the formula —CH=$CB^1B^2$, in which $B^1$ is cyano and $B^2$ is cyano or $C_1$-$C_4$-alkoxycarbonyl, $R^1$ is $C_1$-$C_4$-alkoxy, $R^2$ is hydrogen or $C_1$-$C_4$-alkyl, $R^3$ is a radical of the formula —$CH_2$—$CH(OR^5)$—$CH_2R^6$ and $R^4$ is $C_1$-$C_4$-alkanoylamino, $R^5$ is hydrogen or $C_1$-$C_4$-alkanoyl and $R^6$ is chlorine, bromine, hydroxy, phenoxy, allyloxy, $C_1$-$C_4$-alkoxy or $C_1$-$C_4$-alkanoyloxy.

* * * * *